(12) United States Patent
Warren et al.

(10) Patent No.: US 11,372,630 B2
(45) Date of Patent: *Jun. 28, 2022

(54) EFFICIENT IMMUTABLE SYNTAX REPRESENTATION WITH INCREMENTAL CHANGE

(71) Applicant: Microsoft Technology Licensing, LLC, Redmond, WA (US)

(72) Inventors: Matthew J. Warren, Redmond, WA (US); Mads Torgersen, Issaquah, WA (US); Renaud Paquay, Redmond, WA (US); Neal M. Gafter, San Jose, CA (US); Jared Parsons, Seattle, WA (US); David N. Schach, Redmond, WA (US); Aleksey V. Tsingauz, Seattle, WA (US); Peter Golde, Bellevue, WA (US); Kevin Andrew Pilch, Snohomish, WA (US); Karen Liu, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 209 days.

This patent is subject to a terminal disclaimer.

(21) Appl. No.: 16/792,706

(22) Filed: Feb. 17, 2020

(65) Prior Publication Data

US 2020/0183667 A1 Jun. 11, 2020

Related U.S. Application Data

(63) Continuation of application No. 12/683,445, filed on Jan. 7, 2010, now Pat. No. 10,564,944.

(51) Int. Cl.
*G06F 16/22* (2019.01)
*G06F 8/41* (2018.01)

(52) U.S. Cl.
CPC .......... *G06F 8/427* (2013.01); *G06F 16/2246* (2019.01)

(58) Field of Classification Search
CPC ............................. G06F 16/2246; G06F 8/427
See application file for complete search history.

(56) References Cited

U.S. PATENT DOCUMENTS

| 7,203,701 | B1 * | 4/2007 | Packebush | G06F 16/9027 |
| | | | | 715/713 |
| 8,060,619 | B1 * | 11/2011 | Saulpaugh | G06F 16/1834 |
| | | | | 709/227 |
| 2003/0204513 | A1 * | 10/2003 | Bumbulis | G06F 16/2246 |
| 2007/0143327 | A1 * | 6/2007 | Rivas | G06F 16/258 |
| 2008/0183726 | A1 * | 7/2008 | Bruckner | G06F 16/2455 |
| 2009/0164428 | A1 * | 6/2009 | Green | G06F 16/258 |

(Continued)

*Primary Examiner* — Eliyah S. Harper
(74) *Attorney, Agent, or Firm* — Wade IP Law PLLC

(57) ABSTRACT

Efficient immutable syntax representation with parent pointers under incremental change is enabled by creating a data structure comprising at least one tree structure that allows both upward and downward references in the tree and a tree structure that is immutable (read-only), and allows parts of itself to be re-used in other data structures. The data structure described enables tools to search and target particular sub trees. The fragment of the tree representing the targeted sub tree is produced as it is used. The rest of the tree is not produced. The read-only tree retains relative information, allowing it to be reassembled and shared.

20 Claims, 7 Drawing Sheets

(56) References Cited

U.S. PATENT DOCUMENTS

| | | | |
|---|---|---|---|
| 2009/0199090 A1* | 8/2009 | Poston | G06F 16/907 |
| | | | 707/999.102 |
| 2009/0228474 A1* | 9/2009 | Chiu | G06F 16/24568 |
| | | | 707/999.005 |
| 2009/0254594 A1* | 10/2009 | Burchall | G06F 16/2453 |
| 2009/0281792 A1* | 11/2009 | Green | G06F 16/24526 |
| | | | 707/E17.014 |

* cited by examiner

EFFICIENT IMMUTABLE SYNTAX REPRESENTATION WITH INCREMENTAL CHANGE

CROSS-REFERENCE TO RELATED APPLICATION(S)

This application is a continuation of U.S. patent application Ser. No. 12/683,445, entitled "EFFICIENT IMMUTABLE SYNTAX REPRESENTATION WITH INCREMENTAL CHANGE," filed Jan. 7, 2010, which is incorporated herein by reference in its entirety.

BACKGROUND

In computer science, a tree is a hierarchical data structure of linked nodes. A tree is an acyclic connected graph in which each node in the tree has zero or more child nodes and at most one parent node. A node may contain a value, a condition, or may represent a separate data structure (such as another tree). By convention a child node is "below" its parent in the tree, which is to say, computer science trees, unlike trees in nature, grow down instead of up. A node that has a child is called the child's parent node, its ancestor or its superior node.

A tree is represented in a computer by nodes in memory and references that represent the edges in the tree. Each parent node has a reference to its child node(s), but not every child node has a reference to it parent node. A node that has no children is called a leaf node or a terminal node. The height of a node is the length of the longest downward path to a leaf from that node. The height of the root is the height of the tree. The depth of a node is the length of the path to its root (i.e., its root path). The topmost node in a tree is called the root node. The root node does not have a parent. Operations on a tree commonly begin at the root node. Any node in the tree can be reached from the root node by following pointers or links between nodes. An operation is frequently performed when a particular node in the tree is reached. An internal node is any node of a tree that has child nodes. Thus a leaf node is not an internal node because a leaf node has no child nodes.

Each node in a tree can be seen as the root node of the subtree that descends from that node. The term "subtree" refers to a tree consisting of a node in the tree and all the descendants of that node in the tree. The subtree corresponding to the root node is the entire tree; the subtree corresponding to any other node is called a proper subtree. Trees can be represented in many different ways. Some common representations represent a node as a record allocated on the heap (not to be confused with the heap data structure) with pointer(s) to its child node(s), its parent, or to both child node(s) and parent node, or as an item in an array, with relationships between nodes determined by the position of the nodes in the array (e.g., a binary heap).

A tree can be traversed by following connections or pointers between a series of parent nodes and the parents' child node(s). A pre-order traversal arrives at a parent node before it reaches the parent node's child node(s). A post-order traversal is one in which the child nodes of a parent node are traversed before the parent node is traversed.

A parse tree or syntax tree is typically an ordered, rooted tree that represents the syntactic structure of a string according to some formal grammar. In a parse tree, the interior nodes are labeled by non-terminals of the grammar, while the leaf nodes are labeled by terminals of the grammar. One type of program that produces such trees is called a parser. Parse trees or syntax trees are frequently generated during processing of computer programming languages.

SUMMARY

A tree that is unchangeable can allow multiple clients on multiple threads to use the same tree without risk of observing changes caused simultaneously by other threads. Furthermore, being able to use and re-use parts of the tree makes processing more efficient because the whole tree does not have to be created over and over again when only small parts of the tree are changed. Portions of a tree can be re-used in a uni-directional tree, a tree in which nodes of the tree only point to one or more nodes either directly beneath it or directly above it. That is, in a tree that has pointers in only one direction, the root may point to the nodes directly below it and each of those nodes may point to the node or nodes directly below it (and so on) but any node in the tree does not point both to its parent node and to its child node(s). It is frequently the case, however, that trees that have pointers in both directions (bi-directional pointers) are far more useful than trees with uni-directional pointers. Traditional trees with bi-directional pointers are not re-useable and non-re-useable trees are more costly in terms of processing resources and are therefore typically less efficient.

To enable a consumer to create a new version of a tree used by multiple consumers without sacrificing efficiency or data integrity, a data structure comprising a first immutable private tree and a second public tree is created. The public tree controls access to the private tree. The combination of the private and public trees enable both upward and downward references in the data structure to exist, and enables immutable (read-only or unchangeable) and changeable characteristics to co-exist in the same data structure. Parts of the data structure can be re-used in other tree data structures. The private tree retains relative information which allows it to be reassembled and re-used. The public tree retains consumer-specific information and enables tools to search and target particular sub-trees in the private tree. Construction of the public tree (except for the root node) can be deferred until a node in the public tree is requested. The public tree can be constructed on demand in response to a consumer request to access a node in the private tree.

The data structure described above can be used to present compiler-generated trees such as parse trees, syntax trees, semantic trees and bound trees in a way that allows bi-directional pointers, consumer-specific and relative position to be represented, is both immutable and yet allows for efficient creation and evolution of trees, creating new versions of a read-only tree of the data structure without recreating the whole tree.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Trees such as computer language parse trees (the output of a language parser that describes the input source code broken down into grammar elements), syntax trees, semantic trees and bound trees (tree that include binding information such as derived members, etc.) are useful to many different types of consumers, including development tools such as compilers, debuggers, source code editors, class designers, architecture explorers, code analyzers such as metrics, rules checkers and source code refactoring tools and so on. To give multiple consumers access to the same tree at the same time while maintaining data integrity, the tree can be represented as an immutable (read-only) structure.

A consumer may also want to be able to make modifications to a tree, either directly or indirectly (e.g., indirectly modifying a tree by modifying text in a file from which the tree is generated). However, because the consumer cannot directly modify a shared read-only tree, a new read-only tree has to be constructed to represent the consumer's modified version of the tree while still allowing the other consumers to work with the original tree. Ideally, at least parts of the existing tree would be able to be re-used when constructing the new tree. Consumers of tree data structures often want to have the ability to navigate up and down through the structure, so both upward and downward references are helpful, but pieces of trees with upward and downward references cannot be re-used in other trees.

Figure 1A:
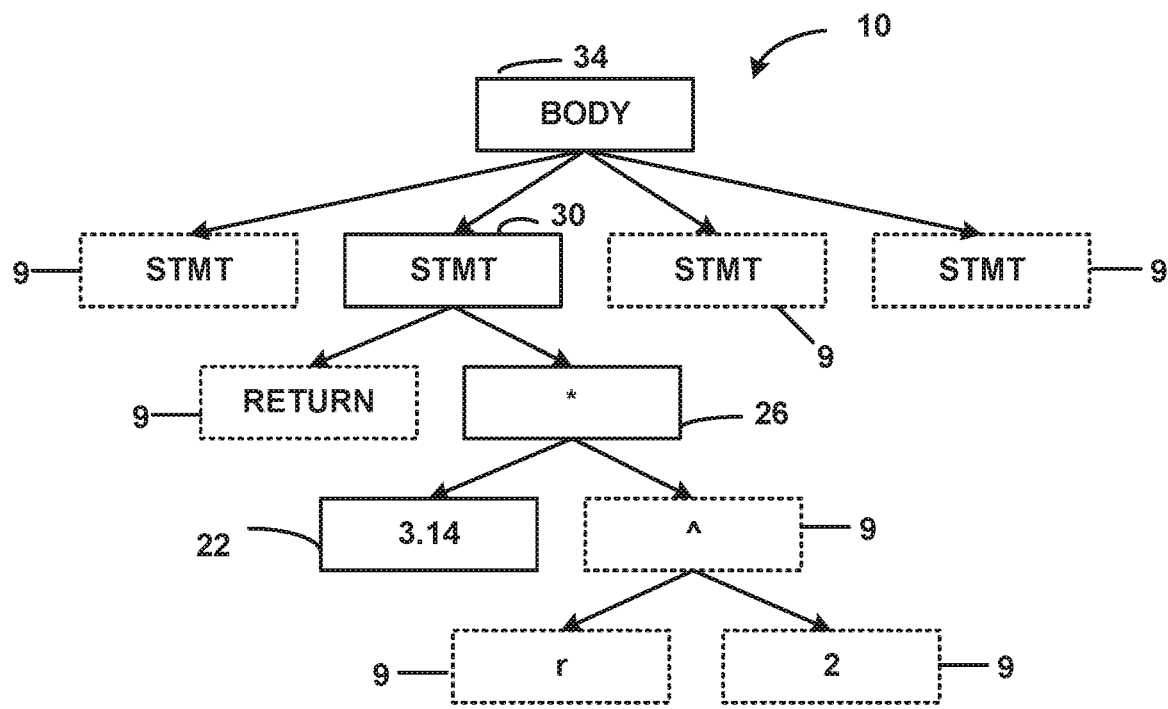
FIG. 1a is a block diagram of an example of tree data structure as is known in the art.
Figure 1B:
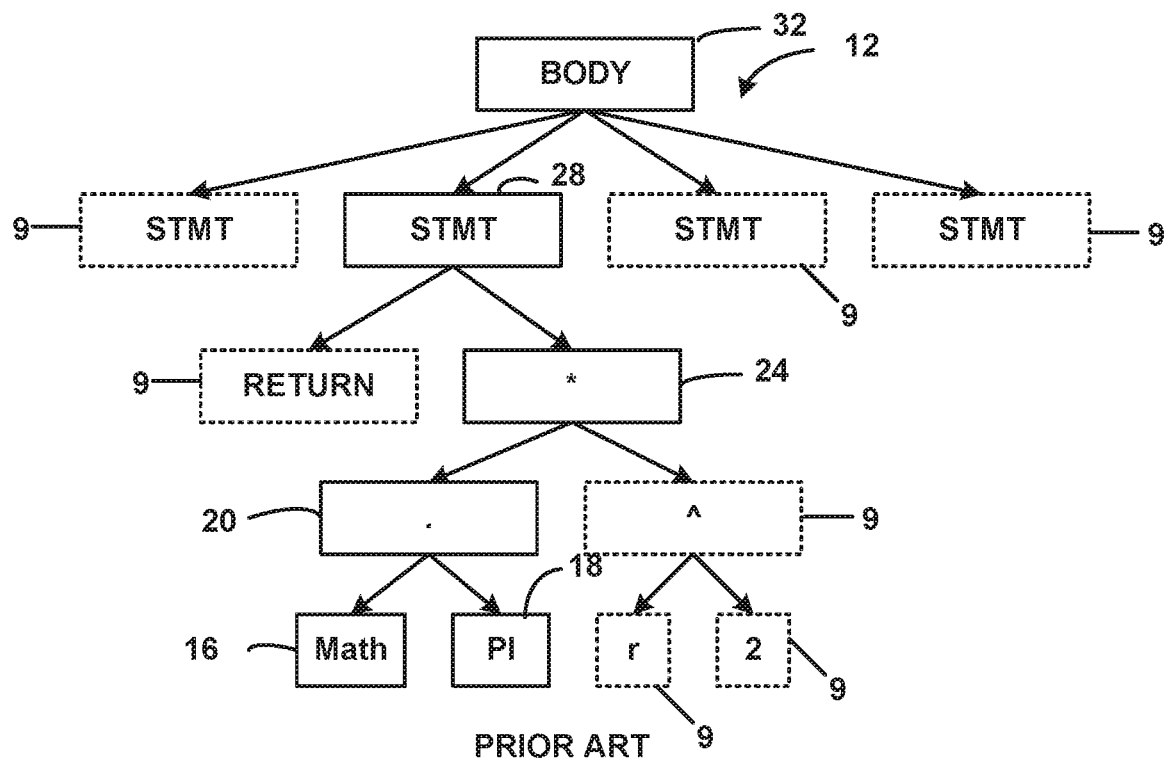
FIG. 1b is a block diagram of another example of a tree data structure as is known in the art.

To understand why this is so, FIG. 1a illustrates a parse tree, tree 10 that might be generated to represent the statement "Return 3.14*r^2". Tree 10 has uni-directional pointers that point downward (from parent node to child node). Referring now to FIG. 1b, suppose that a consumer wants to modify tree 10 to reflect the statement "Return Math.PI*r^2" (replacing the node representing "3.14" with nodes representing "Math.PI"). Tree 12 of FIG. 1b reflects the new statement, "Return Math.PI*r^2". As shown in FIGS. 1a and 1b, tree 10 is separate from tree 12. This means that tree 12 uses substantially the same amount of memory that tree 10 does because a separate tree (tree 12) that shares no nodes with tree 10 has been constructed. For large trees containing thousands of nodes, such a process lacks efficiency (is resource-costly).

To make the process of creating a tree that represents the modified statement "Return Math.PI*r^2" more efficient, the unchanged parts of tree 10 can be shared by the two trees. The nodes that clearly cannot be shared between tree 10 and a second tree that shares some nodes with tree 10 are node 16 representing "Math", node 18 representing "PI" and node 20 representing ".". These nodes cannot be shared because there are no corresponding nodes to node 16 and node 18 in tree 10 and the corresponding node to node 20 representing "." in tree 12 is node 22 representing "3.14" in tree 10. Clearly node 20 is not the same as node 22.

There are also other nodes in tree 10 that cannot be re-used. Node 24 representing "*" in tree 12 is not the same as node 26 representing "*" in tree 10 because node 26 has two child nodes, the leftmost one of which is node 22 representing "3.14" while tree 12's node 24 representing "*" has a leftmost child node 20 representing ".". Similarly, although node 28 in tree 12 represents "Stmt" and node 30 in tree 10 also represents "Stmt", node 28 and node 30 are not the same because node 28's rightmost child is node 24 which is not the same node as node 26 in tree 10. Similarly node 32 of tree 12 is not the same node as node 34 of tree 10.

Figure 1C:
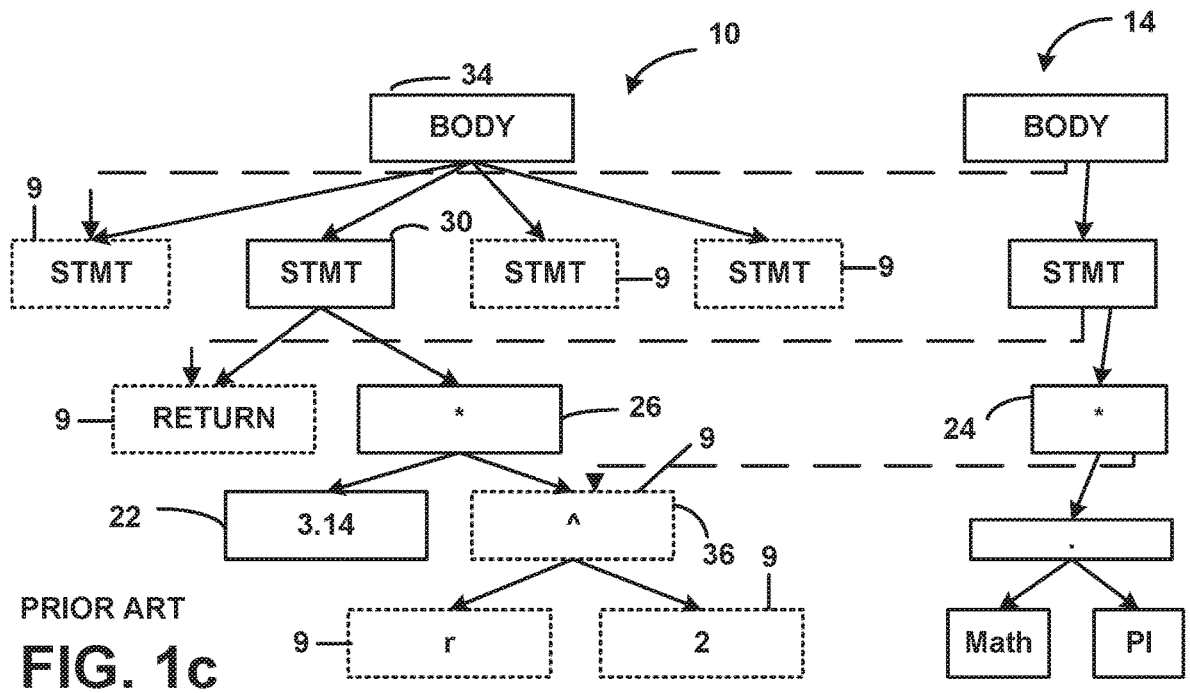
FIG. 1c is a block diagram of another example of a tree data structure as is known in the art.

However, the remaining nodes, the nodes denoted by discontinuous lines and labeled with reference numeral 9 in the two trees, tree 10 of FIG. 1a and tree 12 of FIG. 1b, can be shared. These nodes can be re-used because they are structurally identical. As long as the pointers in the trees are uni-directional (pointing from parent node to child node, in this example), all the nodes denoted with interrupted lines can be shared. FIG. 1c shows a tree 14 in which some of the information that can be shared between the trees is shared by pointing the nodes of the new tree, tree 14, to unchanged nodes in tree 10.

It will be appreciated that sharing portions of trees maintains data integrity until pointers pointing from child to parent in the tree are added. For example, inspection of node 36 of tree 10 in FIG. 1c reveals that there are two possible parent nodes for node 36, node 24 of tree 14 and node 26 of tree 10. Thus, multiple possible post-order traversals of tree 10 and tree 14 are possible. Because multiple possible post-order traversals of tree 10 and tree 14 are possible, data integrity is lost because, for example, there are two possible answers to the question "What is the parent node of node 36?".

In accordance with aspects of the subject matter disclosed herein, a data structure comprises a private tree that is not directly accessible to the consumer or consumers and a public tree that is directly accessible to the consumer or consumers. The public tree provides indirect access to the private tree. The private tree has uni-directional pointers pointing from parent node to child node and can be re-used. The public tree may be a non-re-useable bi-directionally referencing tree or may be a re-useable uni-directional pointing tree. A tree element in the public tree can also point to a corresponding or equivalent tree element in the consumer-inaccessible private tree. That is, a node in the public tree may point to its parent node in the public tree and also may point to an equivalent private tree node. The node in the public tree may also have pointers to its child nodes in the public tree. The pointers to the child nodes in the public tree may be determined lazily (on-demand) when requested by the consumer. If the node in the public tree does not have pointers to its child nodes in the public tree, the public child nodes are created for each request and are not retained or re-used. Hence the data structure appears to the consumer or consumers to have bi-directional references but still maintains data integrity because of the hidden private tree.

The characteristics described above allow for efficient incremental updates of the data structure. Suppose a consumer wants to create a version of a tree that differs from an original tree only in a single node. The consumer can create a data structure comprising a new public tree that represents the modified statement and a new inaccessible private tree that may share nodes with the previous private tree. A root created for the new public tree represents the tree with the differing node and can coexist with the root for the original tree with maximal sharing of existing nodes in the original tree.

The new tree can be created on demand, so the child nodes of the new tree will only be produced if a consumer makes a request to access or change the statement represented by the original tree. As a result, the described data structure provides an immutable tree structure with bi-directional pointers, enabling efficient non-destructive updates that allow the pre- and post-update trees to coexist, and permits sharing between the different versions of the private trees.

Efficient Immutable Syntax Representation with Incremental Change

Figure 1E:
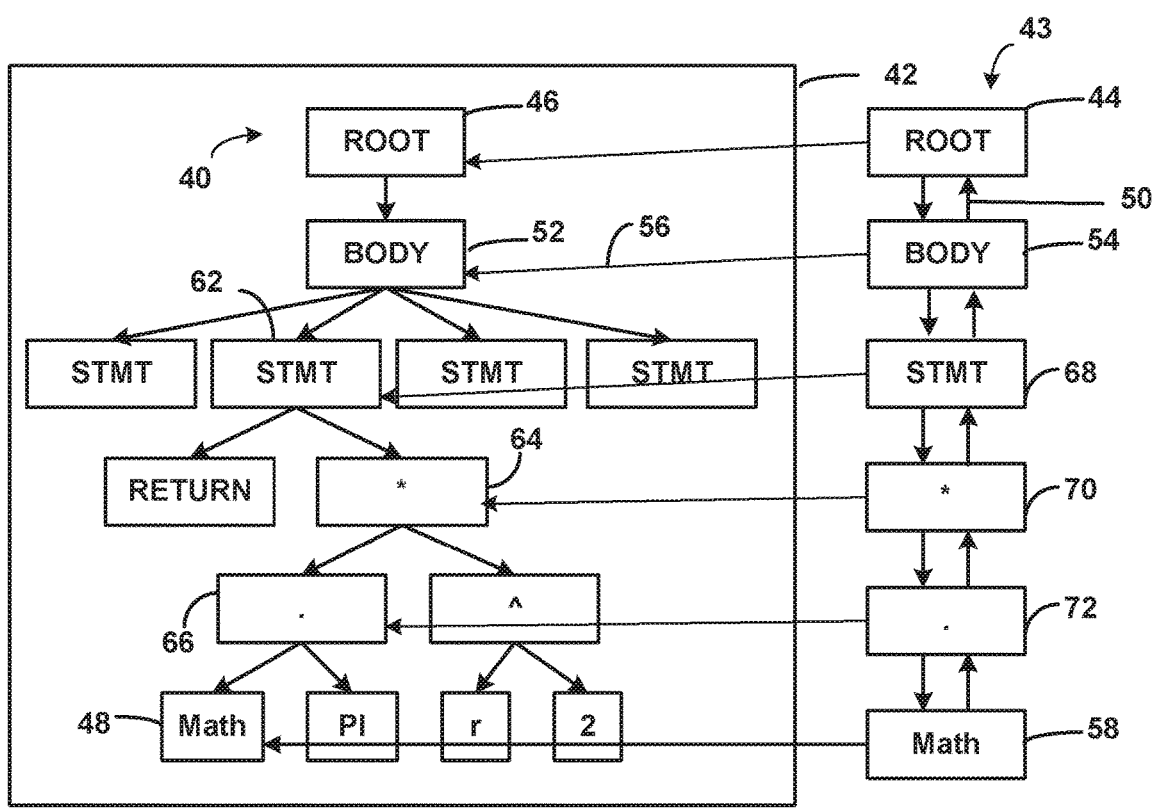
FIG. 1e is a block diagram of a data structure in accordance with aspects of the subject matter disclosed herein.
Figure 1D:
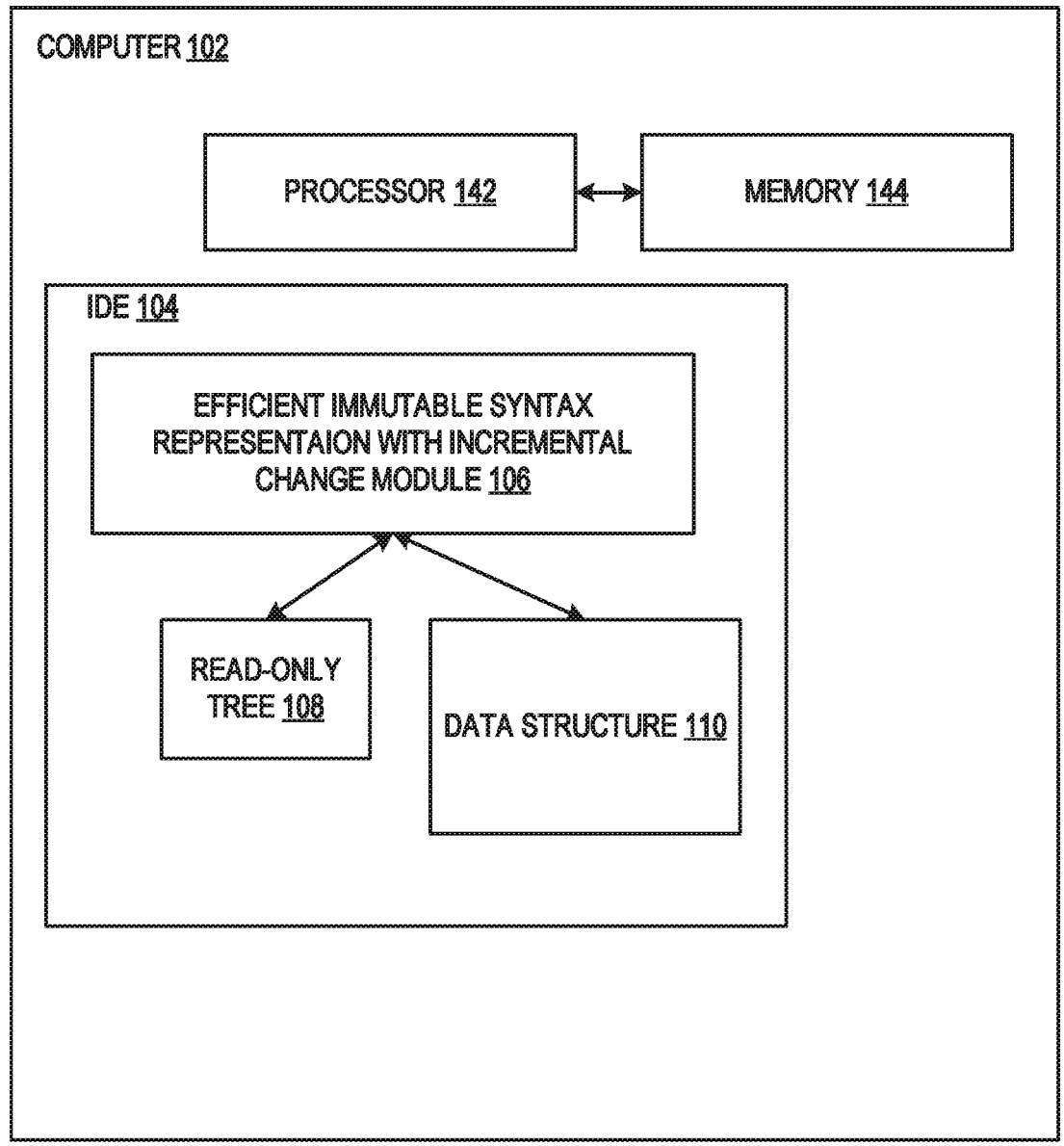
FIG. 1d illustrates an example of a system 100 for efficient immutable syntax representation with incremental change in accordance with aspects of the subject matter disclosed herein.

FIG. 1d illustrates an example of a system 100 for efficient immutable syntax representation with incremental change in accordance with aspects of the subject matter disclosed herein. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (e.g., IDE 104) such as the ones described and illustrated below with respect to FIG. 4. Alternatively, system 100 or portions thereof may be provided as a stand-alone system or as a plug-in or add-in.

System 100 may include one or more of: a processor (such as processor 142), a memory 144, and a module for efficient immutable syntax representation with incremental change 106. Other components well known in the arts may also be included but are not here shown. It will be appreciated that the module for efficient immutable syntax representation with incremental change 106 can be loaded into memory 144 to cause one or more processors such as processor 142 to perform the actions attributed to the module for efficient immutable syntax representation with incremental change 106. The module for efficient immutable syntax representation with incremental change 106, in accordance with aspects of the subject matter disclosed herein, may receive or generate a read-only tree such as parse tree 108 and produce output comprising one or more data structures 110 as described more fully below.

The module for efficient immutable syntax representation with incremental change 106 may include one or more of the following: a compiler such as a background compiler, a parallel compiler or an incremental compiler, a parser such as a background parser, parallel parser or incremental parser or a plug-in, a pre-processor, or an add-in or extension to an IDE, parser, compiler or pre-processor. The module for efficient immutable syntax representation with incremental change 106 may disassemble textual or non-textual information and can build therefrom a tree representing blocks of information. The module for efficient immutable syntax representation with incremental change 106 may be attached to, incorporated within or associated with an interactive design time source code editor and may be capable of parsing any programming language(s) including C# (CSharp), Visual Basic, C, C++, Java, Ruby, Perl, Python, Fortran, Cobol and others.

In operation the module for efficient immutable syntax representation with incremental change 106 may generate or receive one or more trees including but not limited to compiler-generated trees such as parse trees, syntax trees, semantic trees, bound trees and so on and may generate therefrom a data structure as described more fully below. Referring now to FIG. 1e, given a read-only first tree (e.g., a private tree), for example, tree 40, representing the statement "Return Math.l*r^2", the module for efficient immutable syntax representation with incremental change 106 conceals the first tree from, or makes the first tree inaccessible or unavailable to the consumer. The module for efficient immutable syntax representation with incremental change 106 may conceal the private tree in response to receiving input comprising a request to access or modify a node in tree 40, or alternatively, trees may be rendered unavailable to consumers before a request from a consumer is received. The unavailability of tree 40 is represented in FIG. 1e by the box 42 that is shown around tree 40. According to some aspects of the subject matter disclosed herein, indirect access to the read-only first tree is granted to consumers by creating a second read-only tree (e.g., a read-only public tree), such as tree 43, which controls access to the first tree. The second tree, tree 43 can not be modified directly by the consumer however, the second tree can be used in the construction of one or more new trees, where the new tree(s) represent information that is a modification of information used to generate the second tree.

To create the second tree, tree 43, a root node, root node 44, is created that wraps the root node 46 of the first tree, tree 40. The root node of the second tree acts as a proxy or façade around the root node of the first tree but maintains its own identity. Any information about the nodes in the first tree can be obtained by creating nodes in the second tree, where the created nodes of the second tree wrap corresponding nodes in the first tree. To obtain information about a particular node of the first tree, corresponding nodes are created in the second tree, the nodes wrapping corresponding nodes of the first tree along the path to the particular requested node. The second tree obtains the information from the first tree and returns the information from the first tree to the consumer. In addition to creating nodes in the second tree, pointers from child to parent in the second tree are created.

For example, suppose the content of node 48 in tree 40 is desired. Referring again to FIG. 1e, the root node, root node 44 that wraps root node 46, is created. Root node 44 points to root node 46. The child pointer of root node 46 is accessed to find root node 46's child node, node 52. Node 54 that points to node 52 is created in tree 43. A field in node 54 includes a pointer to node 52, that is, pointer 56. A pointer to node 54's parent node, root node 44 is also created (e.g., pointer 50). This process is followed for all the nodes in the read-only first tree along the path to the desired node.

Typically, when a operation on a tree is being performed, just a small part of the tree is traversed. Suppose for example, a consumer is looking for a particular node in tree 40, Suppose the consumer is looking for a node at a particular position in a tree, e.g., tree 40. Suppose the node at that position is node 48, whose content is "Math". In this example, nodes are created for the nodes that are on the path to the nodes whose contents are "Math", namely, node 62, node 64 and node 66. Node 68 is created in tree 43 corresponding to node 62. Node 70 is created in tree 43 corresponding to node 64. Node 72 is created in tree 43 corresponding to node 66. Nodes corresponding to any other node in the first tree are not created.

According to other aspects of the subject matter disclosed herein, for other paths in the first tree no nodes in the second tree are created. In accordance with aspects of the subject matter disclosed herein, potentially any part of the read-only tree can be accessed by creating nodes in the second tree but nodes are only created if they are along a path to a desired node, hence imparting efficiency in tree operations while maintaining a read-only tree that can be shared by multiple consumers without sacrificing data integrity. Alternatively two separate trees are created at the outset and the full processing cost is assessed at the outset. In accordance with aspects of the subject matter disclosed herein, the second tree can be cleared from memory by the garbage collection or housekeeping processes when the consumer is finished using the second tree. Subtrees of the first tree that are no longer referenced by any remaining first or second tree nodes may also be cleared from memory.

Similarly, when instead of inspecting a node in the read-only tree, a consumer wants to modify a node in the read-only tree, a new tree is created. The process described above is performed on the public read-only tree except that the contents of the node corresponding to the node in the read-only tree that the consumer wants to change is not pointed to by the corresponding node in the new tree. Also, content of the node of the new tree is set to the new value. That is, a content field in the new tree may be set to a value different than a value of a corresponding field in a corresponding node in the read-only public tree. For example, if a consumer wanted to change the contents of node 58 in tree 43 from "Math" to "PI", the pointer to node 58 would not be created and the contents of the node of the new tree corresponding to node 58 would be set to "PI". Additional nodes may be added to the new tree as needed, as is commonly known.

Because the new tree is used by a single consumer, each node in the new tree can be used to keep track of a consumer-specific information such as absolute position of the node in a particular file or document. For example, given a document comprising text, each word in the document may exist at a particular location within the text buffer associated with that version of the document. The word "Math" may be at position 20, for example, in the text buffer for the document. The node in the new tree corresponding to node 58 in tree 43 can include the absolute position 20, because the new tree is not re-useable by another consumer. In contrast nodes in the read-only public tree, e.g., tree 43, because the text buffer for each consumer is likely to start at a different location, nodes in the read-only public tree contain relative positional information such as the width of the node or the number of characters in the node. The new tree can sum the width of the nodes in the path to a particular node and add the sum to a start position of the text buffer to determine an absolute location of the node in the document.

Figure 2A:
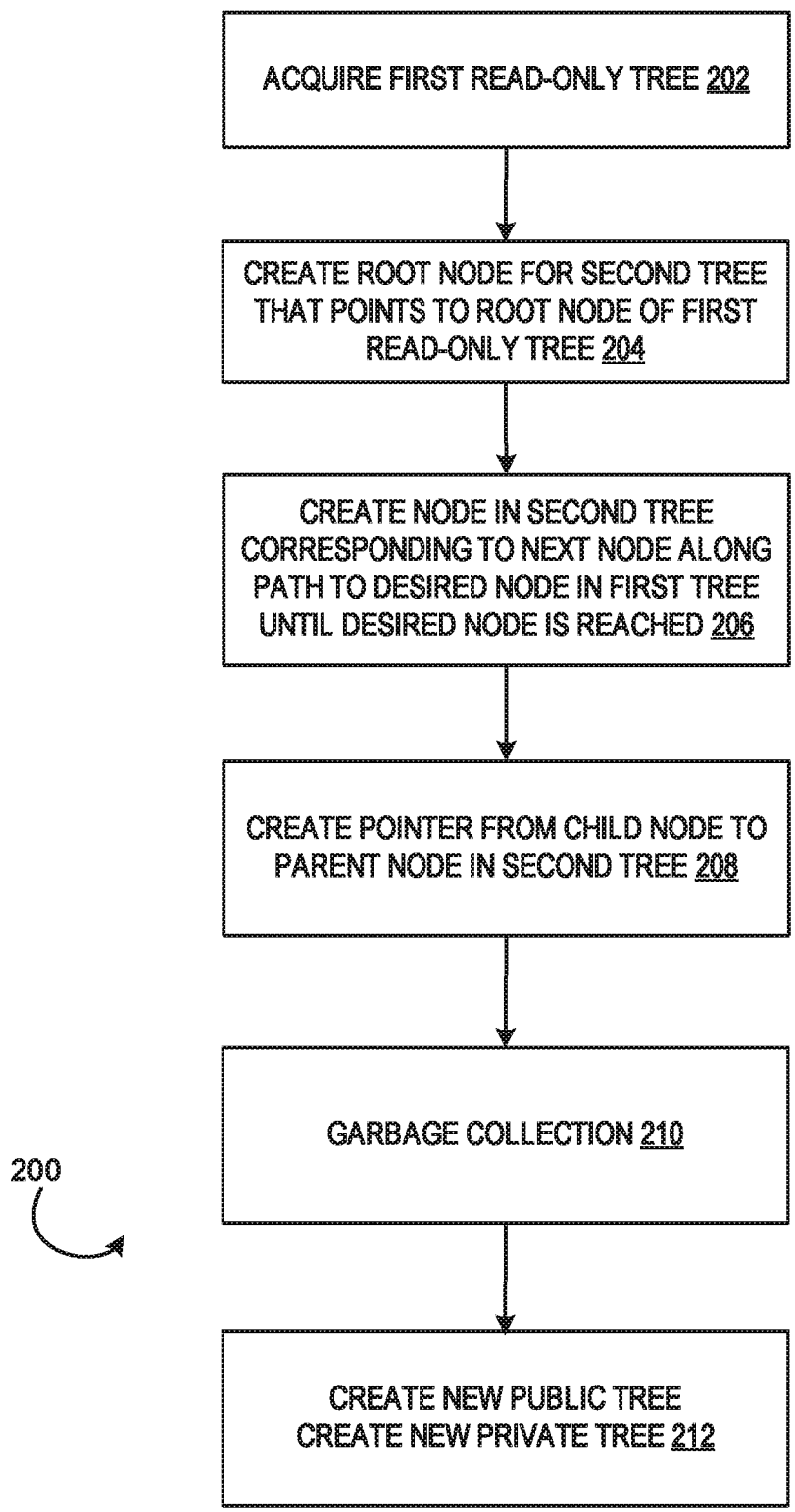
FIG. 2a is a flow diagram of an example of a method for efficient immutable syntax representation with incremental change in accordance with aspects of the subject matter disclosed herein.
Figure 2B:
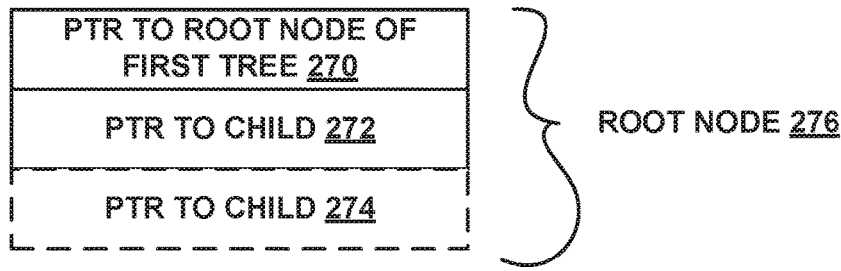
FIG. 2b is a block diagram of an example of a root node in accordance with aspects of the subject matter disclosed herein.

FIG. 2a illustrates an example of a method 200 for efficient immutable syntax representation with incremental change in accordance with aspects of the subject matter disclosed herein. In accordance with some aspects of the subject matter disclosed herein, at 202 a read-only private tree is acquired, generated or received. The private tree may be made inaccessible to a consumer by creating a new root for a public tree where the new root for the public tree wraps the root node of the private tree and controls access to the private tree. Referring now to FIG. 2b, the new root node, e.g., root node 276, may include one or more of the following fields: a pointer to the root node of the private tree 270, and one or more pointers to a child node, as illustrated in FIG. 2b by the pointer to child field 272, 274, etc. At 204 a request from a consumer to access or modify a node in a tree is received. In response thereto, the consumer is provided with access to a root node that represents the public tree that controls access to the private tree.

Figure 2C:
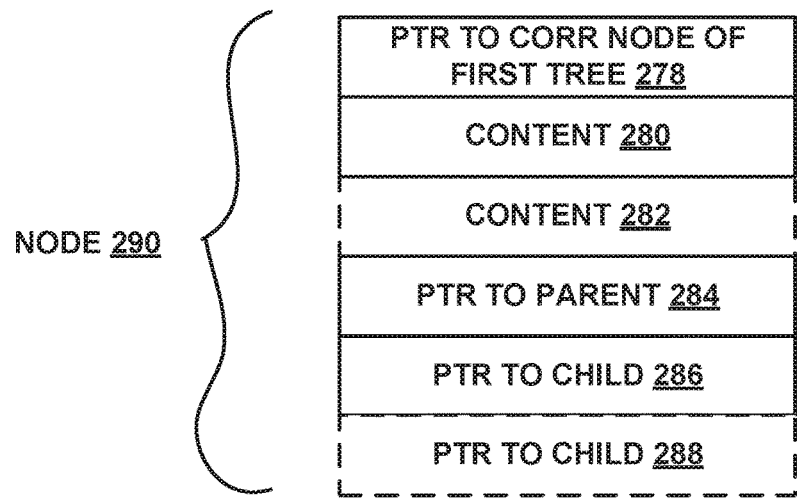
FIG. 2c is a block diagram of an example of a non-root node in accordance with aspects of the subject matter disclosed herein.

At 206 in response to receiving the request, additional nodes in the public tree may be created by following the pointers in the private tree to traverse the path in the private tree to the desired node. Whenever a next node in the private tree is reached, a corresponding node in the public tree is created. At 208, pointers in the public tree are generated. For example, a pointer from the created or generated node is created that points to the parent node of the generated node. An example of a structure of a non-root node is illustrated in FIG. 2c. A node 290 in the second tree may include a field 278 for a pointer to the corresponding node of the private tree, one or more fields to store content, fields 280, 282, etc., a pointer from the node 290 to its parent node in the public tree 284 and one or more pointers to child nodes of the node 290 in the public tree, fields 286, 288, etc. Nodes are created in the public tree for each node in the path in the private tree until the desired node in the private tree is reached.

Figure 2D:
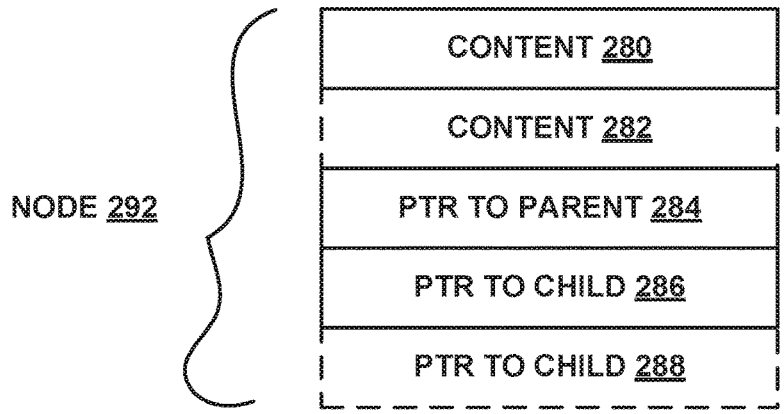
FIG. 2d is a block diagram of another example of a non-root node in accordance with aspects of the subject matter disclosed herein.

If the consumer request was an access request, when the consumer is finished with the public tree the space it uses can be reclaimed by garbage collection at 210. A consumer can request a change to the public tree. Such a request causes a new public tree to be produced and causes a new consumer-inaccessible private tree to be produced at 212. The new inaccessible tree may share nodes with the previous private tree. That is, if the consumer request was a request to create a new tree comprising a modification of an existing tree, the new tree can reuse subtrees of the original private tree. If a consumer creates such a tree, the newly-created tree cannot be shared. The consumer actively constructs new trees from a combination of old sub-trees and new pieces, setting the content of the corresponding node in the new tree to the new value. Additional nodes may be added to the new tree, as needed for sub trees added to the new tree for which there are no corresponding nodes in the read-only public tree. In this case, the pointer to corresponding node of the read-only tree, field 278 is set to null. Alternatively, a second non-root node type may not have a field for the pointer to corresponding node of the read-only tree field 278, as illustrated by node 292 of FIG. 2d. If a consumer wants to modify the new tree, another tree comprising a read-only root node pointing to the root node of the new tree can be created. Alternatively, a read-only copy, version or snapshot can be constructed of the entire new tree if for example, the consumer requests to access or modify a node in the new tree. The root node of the read-only tree can be wrapped so that by creating a fourth modifiable tree that points to the root node of the third tree, and so on.

Example of a Suitable Computing Environment

Figure 3:
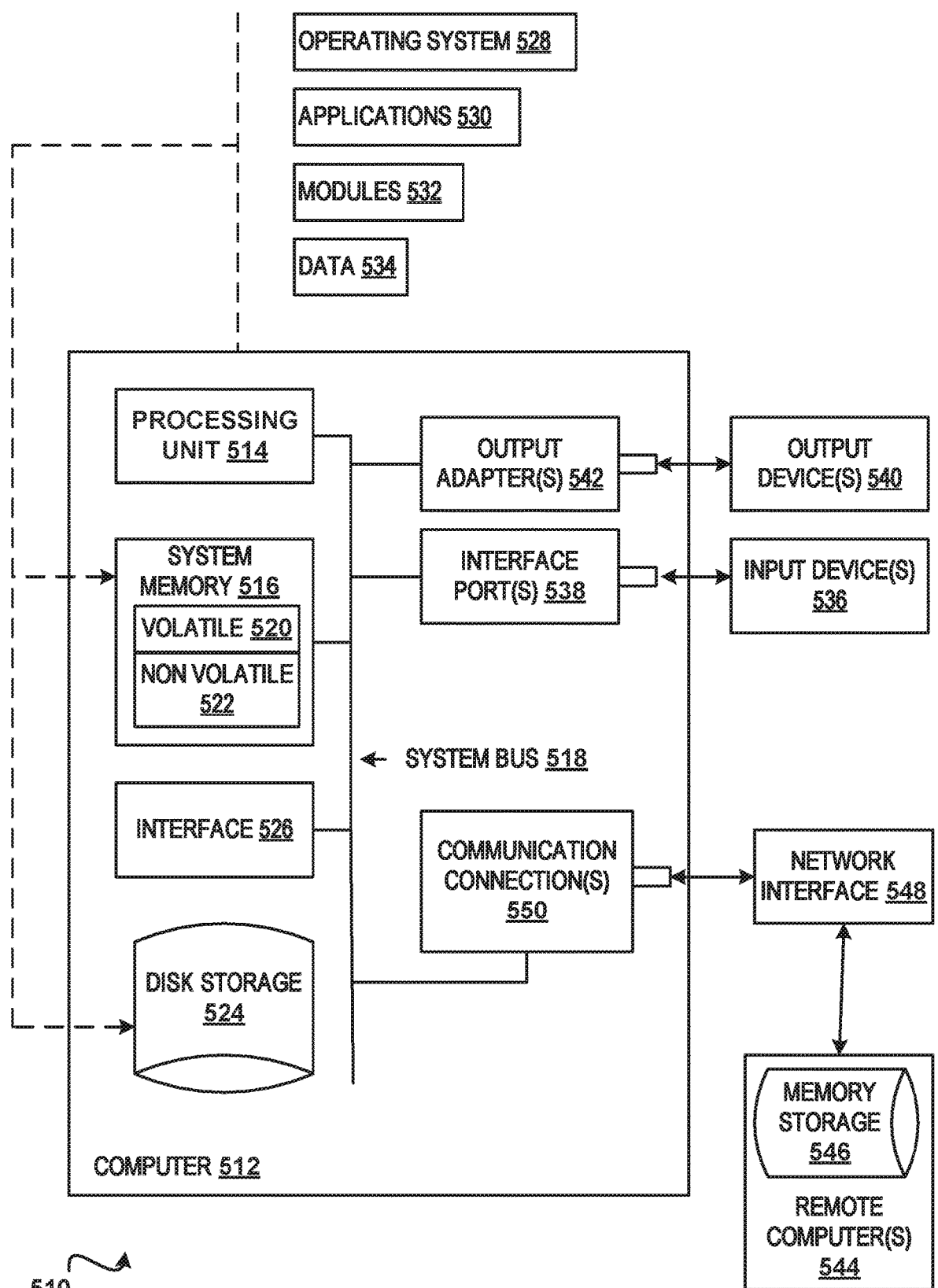
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for software development in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory.

Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
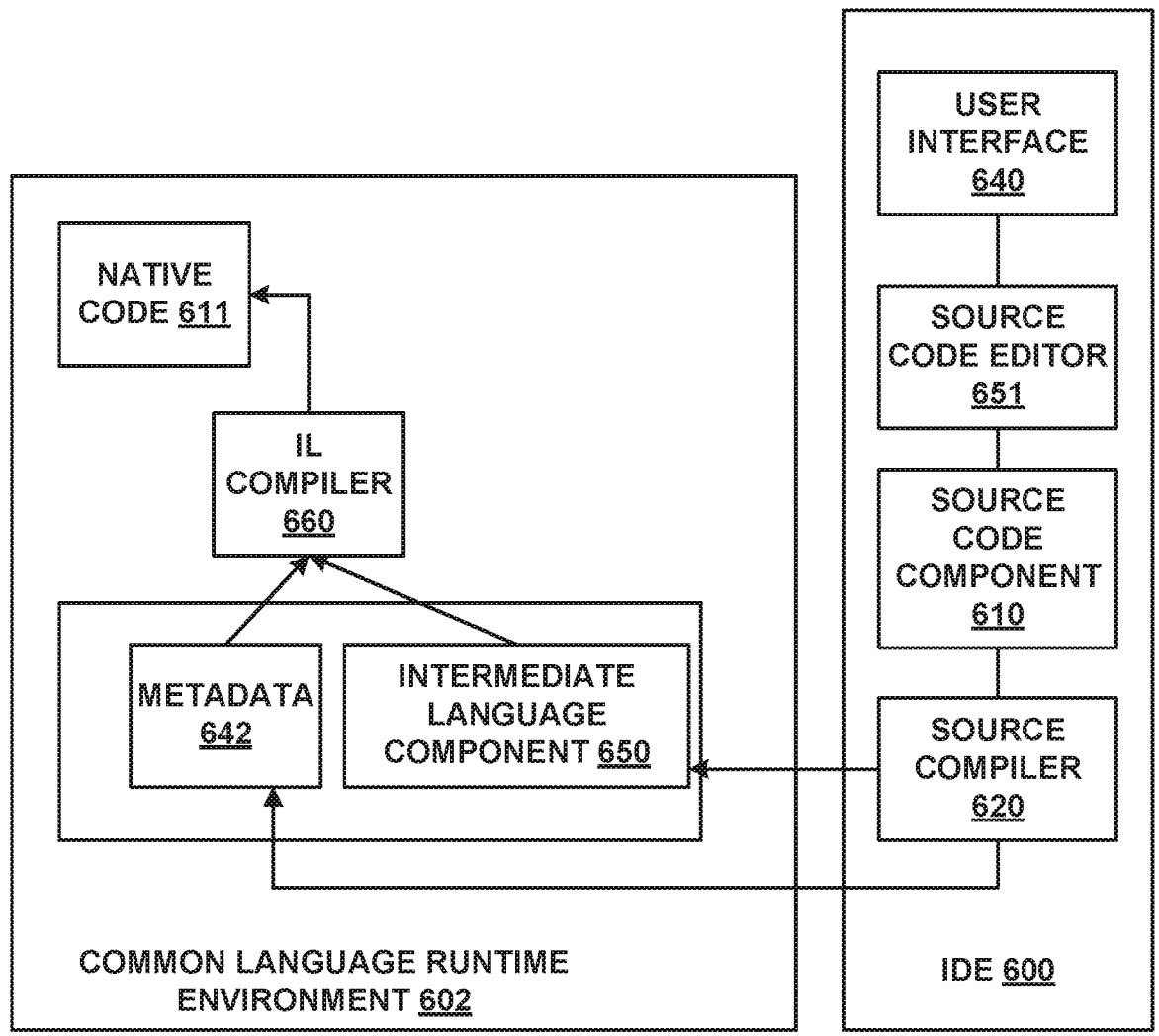
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
   memory; and
   one or more processors coupled to the memory, the one or more processors configured to create a data structure accessible to at least one consumer representing a tree that represents at least one statement of source code, the data structure comprising:
     a re-useable private tree that retains relative information and that represents a shared read-only tree that is not directly accessible to the at least one consumer, the read-only tree including nodes that have uni-directional pointers such that the nodes of the re-useable private tree do not have pointers to parent nodes, the nodes in the read-only tree corresponding to respective elements of the at least one statement of the source code; and
     a public tree that retains consumer-specific information and that is accessible to the at least one consumer, the public tree comprising at least a root node that has a pointer to a root node of the re-useable private tree.

2. The system of claim 1, wherein the one or more processors are configured to:
   construct the public tree on demand by generating a node in the public tree for each node in the re-useable private tree on a path to a requested node in the re-useable private tree, wherein the generated node corresponds to a next node in the re-useable private tree on the path to the requested node, the generated node comprising a pointer to the corresponding node of the re-useable private tree, and a pointer to a parent node of the generated node in the public tree; and
   add additional nodes to the public tree, the additional nodes having no corresponding nodes in the re-useable private tree, such that the additional nodes do not include pointers to nodes in the re-useable private tree.

3. The system of claim 1, wherein the public tree includes a plurality of nodes that wrap corresponding nodes of the re-useable private tree.

4. The system of claim 1, wherein the one or more processors are configured to create a new public tree and a new private tree based at least in part on receipt of a request for a tree that represents a modified version of the re-useable private tree;
   wherein the new private tree represents a tree that differs from the re-useable private tree in at least one node; and
   wherein the new public tree represents a tree that differs from the public tree, which retains the consumer-specific information, in at least one node.

5. The system of claim 1, wherein the data structure is accessible to a plurality of consumers that includes the at least one consumer; and
   wherein the shared read-only tree is indirectly accessible to the plurality of consumers via a plurality of respective public trees that are accessible to the plurality of respective consumers and that retain consumer-specific information with regard to the plurality of respective consumers.

6. The system of claim 5, wherein the plurality of public trees enable the plurality of consumers to access the shared read-only tree at a same time while maintaining data integrity of the shared read-only tree.

7. A system comprising:
   memory; and
   one or more processors coupled to the memory, the one or more processors configured to create a data structure accessible to at least one consumer representing a tree that represents at least one statement of source code, the data structure comprising:
     a re-useable first tree that represents a shared read-only tree that is not directly accessible to the at least one consumer, the read-only tree including nodes that have uni-directional pointers such that the nodes of the first tree do not have pointers to parent nodes, the nodes in the read-only tree corresponding to respective elements of the at least one statement of the source code; and
     a second tree that is accessible to the at least one consumer, the second tree comprising at least a root node that has a pointer to a root node of the first tree;
   wherein the one or more processors are configured to construct the second tree on demand by generating a node in the second tree for each node in the first tree on a path to a requested node in the first tree, wherein the generated node corresponds to a next node in the first tree on the path to the requested node, the generated node comprising a pointer to the corresponding node of the first tree, and a pointer to a parent node of the generated node in the second tree; and wherein the one or more processors are configured to add additional nodes to the second tree, the additional nodes having no corresponding nodes in the first tree, such that the additional nodes do not include pointers to nodes in the first tree.

8. The system of claim 7, wherein the first tree that represents the shared read-only tree is a private tree, and wherein the second tree that is accessible to the at least one consumer is a public tree.

9. The system of claim 8, wherein the one or more processors are configured to create a new public tree and a new private tree based at least in part on receipt of a request for a tree that represents a modified version of the first tree;
wherein the new private tree represents a tree that differs from the first tree in at least one node; and
wherein the new public tree represents a tree that differs from the second tree in at least one node.

10. The system of claim 7, wherein the second tree includes a plurality of nodes that wrap corresponding nodes of the first tree.

11. The system of claim 7, wherein the data structure is accessible to a plurality of consumers that includes the at least one consumer; and
wherein the shared read-only tree is indirectly accessible to the plurality of consumers via a plurality of respective second trees that are accessible to the plurality of respective consumers.

12. The system of claim 11, wherein the plurality of second trees enable the plurality of consumers to access the shared read-only tree at a same time while maintaining data integrity of the shared read-only tree.

13. A system comprising:
memory; and
one or more processors coupled to the memory, the one or more processors configured to create a data structure accessible to at least one consumer representing a tree that represents at least one statement of source code, the data structure comprising:
a re-useable first tree that represents a shared read-only tree that is not directly accessible to the at least one consumer, the read-only tree including nodes that have uni-directional pointers such that the nodes of the first tree do not have pointers to parent nodes, the nodes in the read-only tree corresponding to respective elements of the at least one statement of the source code; and
a second tree that is accessible to the at least one consumer, the second tree comprising a plurality of nodes that wrap corresponding nodes of the first tree, the second tree comprising at least a root node that has a pointer to a root node of the first tree.

14. The system of claim 13, wherein the first tree that represents the shared read-only tree is a private tree, and wherein the second tree that is accessible to the at least one consumer is a public tree.

15. The system of claim 14, wherein the one or more processors are configured to create a new public tree and a new private tree based at least in part on receipt of a request for a tree that represents a modified version of the first tree;
wherein the new private tree represents a tree that differs from the first tree in at least one node; and
wherein the new public tree represents a tree that differs from the second tree in at least one node.

16. The system of claim 13, wherein the data structure is accessible to a plurality of consumers that includes the at least one consumer; and
wherein the shared read-only tree is indirectly accessible to the plurality of consumers via a plurality of respective second trees that are accessible to the plurality of respective consumers.

17. The system of claim 16, wherein the plurality of second trees enable the plurality of consumers to access the shared read-only tree at a same time while maintaining data integrity of the shared read-only tree.

18. A system comprising:
memory; and
one or more processors coupled to the memory, the one or more processors configured to create a data structure accessible to at least one consumer, the data structure comprising:
a read-only private tree representing at least one statement of source code, the read-only private tree including at least one node that includes at least one uni-directional pointer comprising a pointer from a parent node of the read-only private tree to a child node of the read-only private tree, the at least one node corresponding to at least one respective element of the at least one statement of source code; and
a consumer-accessible tree that includes at least a root node, the root node of the consumer-accessible tree comprising a pointer to a root node of the read-only private tree;
wherein the one or more processors are configured to create a new public tree and a new private tree based at least in part on receipt of a request for a tree that represents a modified version of the read-only private tree;
wherein the new private tree represents a tree that differs from the read-only private tree in at least one node; and
wherein the new public tree represents a tree that differs from the consumer-accessible tree in at least one node.

19. The system of claim 18, wherein the consumer-accessible tree is a consumer-accessible public tree.

20. The system of claim 18, wherein the data structure is accessible to a plurality of consumers that includes the at least one consumer;
wherein the at least one statement of source code is not directly accessible to the plurality of consumers; and
wherein the at least one statement of source code is indirectly accessible to the plurality of consumers via a plurality of respective consumer-accessible trees that are accessible to the plurality of respective consumers.

* * * * *